United States Patent [19]

Craport et al.

[11] Patent Number: 5,961,569
[45] Date of Patent: Oct. 5, 1999

[54] SYSTEM AND METHOD FOR IDENTIFYING A GEOGRAPHIC POINT WITHIN A GEOGRAPHIC SECTION

[75] Inventors: William N. Craport, Norcross; Bruce C. Winters, Lawrenceville, both of Ga.

[73] Assignee: BellSouth Corporation, Atlanta, Ga.

[21] Appl. No.: 08/834,710

[22] Filed: Apr. 1, 1997

[51] Int. Cl.$^6$ .................................................. G06F 19/00
[52] U.S. Cl. .......................... 701/200; 701/208; 345/435
[58] Field of Search .................................. 701/200, 207, 701/208, 211; 340/988, 990, 995; 345/118, 418, 435

[56] References Cited

U.S. PATENT DOCUMENTS

| | | | |
|---|---|---|---|
| 4,809,201 | 2/1989 | Keklak | 345/435 |
| 5,550,743 | 8/1996 | Kyrtsos | 701/200 |
| 5,796,634 | 8/1998 | Craport et al. | 701/208 |
| 5,839,088 | 11/1998 | Hancock et al. | 701/211 |

*Primary Examiner*—Gary Chin
*Attorney, Agent, or Firm*—Jones & Askew, LLP

[57] ABSTRACT

A system and method for identifying a geographic point within a geographic section of a geographic area. A geographic area containing a plurality of geographic points is divided into a plurality of non-overlapping geographic regions. A geographic section of the geographic area is selected. A geographic region is selected as a selected geographic region and a region determination is made as to whether the geographic section overlaps the selected geographic region. If the geographic section overlaps the selected geographic region, then a geographic point located within the selected geographic region is selected as a selected geographic point. A point determination is made as to whether the selected geographic point is located within the geographic section. If the selected geographic point is located within the geographic section, then the selected geographic point is identified.

13 Claims, 6 Drawing Sheets

SYSTEM AND METHOD FOR IDENTIFYING A GEOGRAPHIC POINT WITHIN A GEOGRAPHIC SECTION

FIELD OF THE INVENTION

This invention relates in general to the field of geographic coding and in particular to a system and method for identifying a geographic point within a geographic section of a geographic area.

BACKGROUND OF THE INVENTION

A number of wireless devices have been developed to meet the needs of an increasingly mobile society. Devices such as telephones which were once hard-wired to a single location are now portable. Traditionally, when a customer requested telephone service, the customer was assigned a telephone number that was operable from a fixed location such as the customer's home or office. However, when a wireless customer requests service, the wireless customer is assigned a number which is operable over a large geographic area.

Since wireless service is available virtually throughout the United States, a wireless customer may be operating almost anywhere when a problem initiating or completing a wireless communication occurs. A service provider may find it useful to track the locations of reported problems for purposes of system analysis and system resource allocation. By monitoring the locations of customer problems, a service provider may become aware of developing trends and may be able to take preventive action. For example, the occurrence of a number of problems in close proximity to an antenna or other piece of equipment may indicate an equipment problem.

If a wireless customer provides problem location information to a service provider when the customer reports a problem, the service provider may monitor problem locations. A service provider may store the problem location information along with other problem information such as problem type and problem date and time in a data record such as a trouble tracking ticket. By integrating location information with other problem information, a service provider can analyze different types of problems using location information.

To facilitate problem analysis, a service provider may display the problem locations on a map of a geographic area. The service provider may display all of the problem locations or only those problems which relate to a particular type of problem, for example, dropped calls. By including location information with problem type information, the problem locations for all dropped calls may be displayed on a map of the geographic area. Displaying problem locations on a map of the geographic area helps a user visualize the problem location information.

If a map covers a large geographic area, there may be times when it is useful to focus on a smaller section of the map of the geographic area. For example, if problem activity is rapidly increasing in a section of the geographic area, it may be helpful to view only those problems located in the section of the geographic area where the problem activity is increasing. A user may define a section of the map so that only those problems located within the section are displayed. To display only those problems located within a section of the geographic area requires that the problems located in the section be identified. The identification needs to be performed quickly so that the most current problem location information is displayed.

Accordingly, in the field of geographic coding, there is a need for a quicker method of identifying a data record corresponding to a geographic point which lies within a geographic section of a geographic area. There is also a need for a quicker method of determining whether a geographic point lies within a geographic section of a geographic area.

SUMMARY OF THE INVENTION

The present invention provides a system and method for identifying a geographic point within a geographic section of a geographic area. In one embodiment of the present invention, geographic information is stored in a data record such as a trouble tracking ticket for a customer service trouble tracking system. In a customer service trouble tracking system, the geographic information may include longitude and latitude for the geographic point where the problem occurred, as well as a geographic region identifier. The geographic region identifier identifies one of a plurality of geographic regions within a geographic area. To focus on problems within a specific section of the geographic area, a geographic section within the geographic area is defined and data records corresponding to geographic points within the geographic section are identified. Geographic regions and geographic region identifiers are used to limit the number of data records searched to identify data records which correspond to geographic points located within the geographic section.

Advantageously, the present invention provides a system and method for the identification of a geographic point, and an associated data record, located within a geographic section in real time. Real time identification in a customer service trouble tracking system provides valuable information for system analysis and resource allocation. Real time identification insures that during periods of rapidly increasing activity, all geographic points within a geographic section will be identified. If the determination as to whether a geographic point is located within a geographic section is not made in real time, then a rapid increase may not be detected soon enough to take preventative action.

In one preferred method of the present invention, a computer system stores data records containing longitude and latitude for a corresponding geographic point and a geographic region identifier for the geographic region which contains the geographic point. A geographic section of the geographic area is received. To identify a data record corresponding to a geographic point located within the geographic section, a geographic region which overlaps the geographic section is selected as a selected geographic region. A data record which contains a geographic region identifier for the selected geographic region is selected as a selected data record. The geographic point corresponding to the selected data record is selected as a selected geographic point and a point determination is made as to whether the selected geographic point is located within the geographic section. If the selected geographic point is located within the geographic section, then the selected data record is identified.

If the selected geographic point is not located within the geographic section, then another data record which contains a geographic region identifier for the selected geographic region is selected as a second selected data record. The geographic point corresponding to the second selected data record is selected as a second selected geographic point and a point determination is made as to whether the second selected geographic point is located within the geographic section.

In another preferred method of the present invention, a geographic area containing a plurality of geographic points is divided into a plurality of non-overlapping geographic regions. A portion of the geographic area is selected as a geographic section. In addition to selecting a geographic section, one of the non-overlapping geographic regions is selected as a selected geographic region. A region determination is made as to whether the geographic section overlaps the selected geographic region. If the determination is that the geographic section overlaps the selected geographic region, then a geographic point located within the selected region is selected as a selected geographic point. A point determination is made as to whether the selected geographic point is located within the geographic section. If the point determination is that the selected geographic point is located within the geographic section, then the selected geographic point is identified.

Since the geographic section may overlap more than one geographic region, preferably, this preferred method includes selecting another one of the non-overlapping geographic regions as a second selected geographic region. A region determination is made as to whether the geographic section overlaps the second selected geographic region. If the geographic section overlaps the second selected geographic region, then a geographic point located within the second selected geographic region is selected as a second selected geographic point. A point determination is made as to whether the second selected geographic point is located within the geographic section. If the point determination is that the second selected geographic point is located within the geographic section, then the second selected geographic point is identified.

Preferably, if the point determination is that the selected geographic point is located within the geographic section, then another geographic point located within the selected geographic region is selected as a second selected geographic point. A point determination is made as to whether the second selected geographic point is located within the geographic section. If the second selected geographic point is located within the geographic section, then the second selected geographic point is also identified.

If the selected geographic point is not located within the geographic section, then preferably another geographic point located within the selected geographic region is selected as a next selected geographic point. A point determination is made as to whether the next selected geographic point is located within the geographic section. If the next selected geographic point is located within the geographic section, then the next selected geographic point is identified. If the region determination is that the geographic section does not overlap the selected geographic region, then another one of the non-overlapping geographic regions is selected as the selected geographic region and a region determination is made as to whether the geographic section overlaps that selected geographic region.

A preferred system for identifying a geographic point which is located within a geographic section of a geographic area includes a central processing unit (CPU), an input device connected to the CPU, a display device coupled to the CPU, and memory coupled to the CPU for storing a program module. In response to instructions from the program module, the CPU operates to divide the geographic area into a plurality of non-overlapping geographic regions. The CPU also operates to receive information corresponding to a geographic section from the input device. One of the non-overlapping geographic regions is selected as a selected geographic region by the CPU in response to instructions from the program module. The instructions also cause the CPU to make a region determination as to whether the geographic section overlaps the selected geographic region. If the geographic section overlaps the selected geographic region, then a geographic point located within the selected geographic region is selected as a selected geographic point by the CPU in response to instructions from the program module. A point determination is made as to whether the selected geographic point is located within the geographic section. If the selected geographic point is located within the geographic section, then additional instructions operate to identify the selected geographic point. If the selected geographic point is identified, then preferably, the CPU is responsive to instructions to display the selected point on the display device.

Preferably, in the preferred system, the CPU is further operative to select another geographic point located within the geographic section as the selected geographic point and to repeat the operations of (1) making a point determination as to whether the selected geographic point is located within the geographic section and (2) if the selected geographic point is located within the geographic section, then displaying the selected geographic point on the display device.

The CPU is preferably further responsive to select another one of the non-overlapping geographic regions as a second selected geographic region. The second s elected geographic region is used to make a region determination as to whether the geographic section overlaps the second selected geographic region. If the geographic section overlaps the second selected geographic region, then a geographic point located within the second selected geographic region is s elected as a second selected geographic point. A point determination is made as to whether the second selected geographic point is located within the geographic section by the CPU in response to instructions from the program module. If the second selected geographic point is located within the geographic section, then the CPU operates to display the second selected geographic point on the display device.

Preferably, the CPU is responsive to receive a geographic section from the input device where the geographic section is selected from a map of the geographic area using a pointing device as the input device.

Accordingly, it is an object of the present invention to provide a quicker method for identifying data records corresponding to a geographic point which lies within a geographic section. It is a further object of the present invention to provide a quicker method of determining whether a geographic point lies within a geographic section.

DETAILED DESCRIPTION

The present invention is directed to a system and method for identifying a geographic point within a geographic section. The particular embodiments described herein are intended in all respects to be illustrative rather than restrictive. Alternative embodiments will become apparent to those skilled in the art to which the present invention pertains without departing from its spirit and scope.

Preferably, the present invention is implemented with a computer system. The figures included herein may appear (completely or in part) on a computer screen as part of a graphical user interface ("GUI") for interaction with a user. However, the preferred methods described herein do not require that any of the figures appear to the user. Nonetheless, the figures and accompanying detailed description provide an explanation of the steps of the preferred methods of the present invention. These steps may be carried out by the computer system through operations and programming that will be well-known to those skilled in the art.

Application of Invention by Wireless Service Provider

A representative application of the present invention is its use by a wireless service provider in the area of customer service trouble tracking. In the customer service trouble tracking area, the present invention may be used by a wireless service provider to focus on problems within a particular geographic section. If a wireless customer provides the service provider with information describing the location where a problem occurred, the service provider can store location information along with other problem information in a data record such as a trouble tracking ticket. The location information may include longitude and latitude for the problem location and a geographic region identifier for the geographic region which contains the problem location. The longitude and latitude for the problem location may be used to plot the problem location on a map of a geographic area.

The service provider may choose to plot all problem locations on a map of the geographic area or may choose to plot only problem locations associated with a particular type of problem, for example, dropped calls. If the map covers a large geographic area or if there are a large number of problem locations plotted on the map, it may be useful to focus on problem locations within a smaller geographic section of the map. The geographic region identifiers contained in the trouble tracking tickets may be used to filter the trouble tracking tickets to identify problem locations within a geographic section.

To filter the trouble tracking tickets using the geographic region identifiers, the geographic region(s) which overlap the geographic section are identified. Once the geographic region(s) which overlap the geographic section are identified, trouble tracking ticket(s) containing geographic region identifiers matching the overlapping geographic region(s) are identified and are checked to determine whether the problem location is located within the geographic section. If the geographic region identifier of a trouble tracking ticket does not match an overlapping geographic region, then the problem location for the trouble tracking ticket is outside the geographic section and the trouble tracking ticket is eliminated from consideration. By eliminating trouble tracking tickets containing geographic region identifiers for non-overlapping geographic regions, the number of problem locations to be checked is minimized. Consequently, the time required to identify a problem location within the geographic section is also minimized.

In the customer service trouble tracking example, a map or other graphical representation of the problem locations and the geographic area may be displayed, but the geographic regions may not be displayed. Displaying a map or other graphical representation of the problem locations and the geographic area allows a customer service trouble tracking system user to visualize problem location information and to identify problem trends. For example, the presence of a number of problems within a section of the geographic area may indicate a coverage problem in that section.

The Geographic Environment

Figure 1:
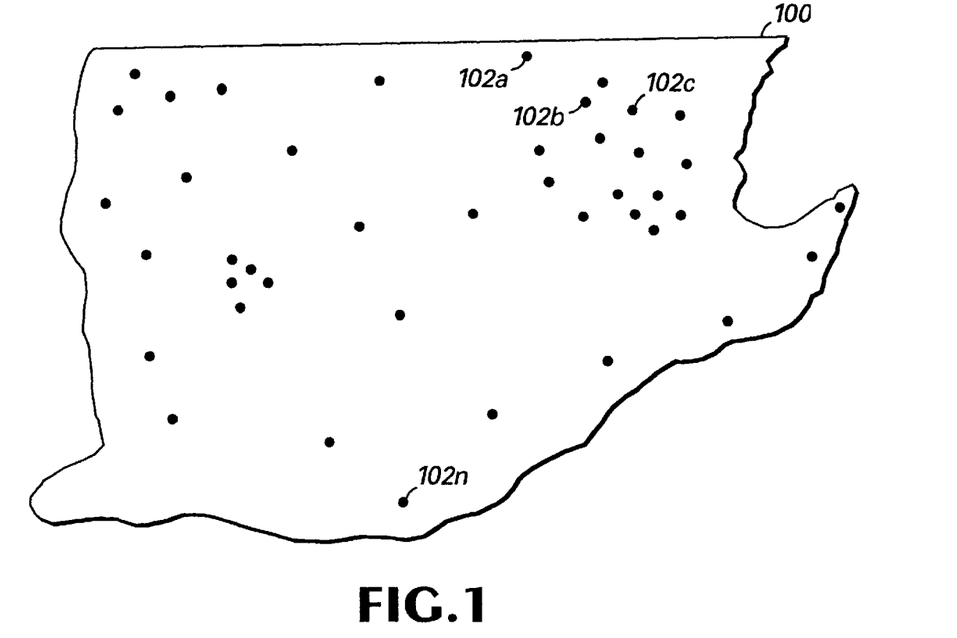
FIG. 1 illustrates an exemplary geographic area and a plurality of geographic points as may be used in connection with the preferred embodiment.

Longitude and latitude preferably provide a geographic coordinate system for use in connection with the present invention. Other coordinate systems such as an x-y coordinate system may be used with the present invention with appropriate adjustments. An exemplary geographic area 100 with a plurality of geographic points 102a . . . 102n located within the geographic area 100 is shown in FIG. 1. The geographic area may be any area of interest and is generally defined by the expected range of geographic points. A geographic point represents a location within the geographic area and preferably is described by longitude and latitude. For example, the geographic area may be a multi-state geographic area and a geographic point may be the location of a customer or device within the geographic area. A method for obtaining longitude and latitude for a location is described in the concurrently filed and commonly assigned U.S. patent application Ser. No. 08/831023 for a System and Method for Identifying the Geographic Region of a Geographic Area Which Contains a Geographic Point Associated with a Location (Attorney Docket No. 19260-0890). Specifically, the section of that patent application entitled Preferred Method for Identifying Geographic Coordinates for a Geographic Point Associated with a Location is incorporated herein by reference. Alternative methods will be apparent to those skilled in the art to which the present invention pertains.

Figure 2:
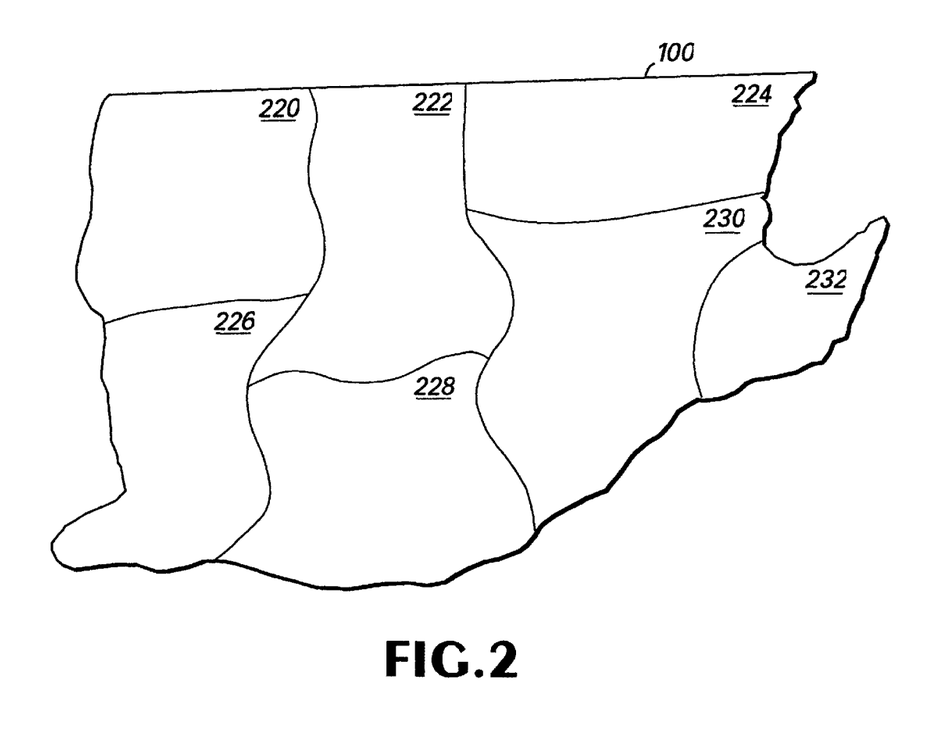
FIG. 2 illustrates the geographic area of FIG. 1 divided into a plurality of non-overlapping geographic regions.

FIG. 2 illustrates the geographic area 100 divided into a plurality of non-overlapping geographic regions 220, 222, 224, 226, 228, 230, and 232. A geographic region may be of any size or shape and may be irregularly shaped. There may be any number of geographic regions in a geographic area. Each geographic region is defined by a region boundary 221, 223, 225, 227, 229, 231, and 233 including a plurality of region boundary points (not individually illustrated). Each region boundary point is a geographic point and preferably is described by longitude and latitude. As an example, a geographic area could be divided into geographic regions corresponding to the first three digits of the zip code zones within the geographic area. The size and shape of a geographic zip code zone is defined by the United States Postal Service. Libraries of longitude and latitude information are available for geographic zip code zones from Geographic Data Technologies, 11 Lafayette Street, Labanon, N.H. 03766. A method for obtaining a geographic region identifier for a geographic region containing a geographic point is described in the previously referenced and commonly assigned U.S. patent application Ser. No. 08/831023 for a System and Method for Identifying the Geographic Region of a Geographic Area Which Contains a Geographic Point Associated with a Location. Specifically, the sections of that patent application entitled Preferred Methods for Identifying the Geographic Region Which Contains a Geographic Point and Preferred Methods for Identifying the Geographic Region Which Contains a Geographic Point Using Estimated Geographic Regions are incorporated herein by reference.

Preferred Method for Identifying a Data Record Corresponding to a Geographic Point Located Within a Geographic Section The present invention provides a preferred method for identifying a data record corresponding to a geographic point located within a geographic section. In the preferred method, a data record is created which contains geographic information for a geographic point. For example, the data record may be a trouble tracking ticket for a customer service trouble tracking system. The trouble tracking ticket may contain longitude and latitude for the geographic point associated with the problem location. The trouble tracking ticket may also contain a geographic region identifier to identify the geographic region which contains the problem location.

The preferred method is illustrated by reference to the figures. FIG. 1 shows a geographic area 100 with a plurality of geographic points 102*a* . . . 102*n* in the geographic area 100. In the customer service trouble tracking example, each geographic point 102*a* . . . 102*n* represents a problem location and corresponds to a trouble tracking ticket. FIG. 2 shows the geographic area 100 of FIG. 1 divided into a plurality of non-overlapping geographic regions 220, 222, 224, 226, 228, 230, and 232. In the customer service trouble tracking example, the geographic area 100 may be a multi-state geographic area and the geographic regions 220, 222, 224, 226, 228, 230, and 232 may be three-digit zip code regions. For example, geographic region 220 may correspond to zip codes beginning with "290", geographic region 222 may correspond to zip codes beginning with "291", and geographic region 226 may correspond to zip codes beginning with "292".

The trouble tracking tickets contain longitude and latitude for the geographic point associated with the problem location. The trouble tracking tickets also contain a geographic region identifier identifying the geographic region which contains the geographic point associated with the problem location. For example, the trouble tracking ticket corresponding to geographic point 102*c* contains longitude and latitude for geographic point 102*c* and a geographic region identifier for geographic region 224. Although the geographic points 102*a* . . . 102*n* may be displayed, the geographic regions 220, 222, 224, 226, 228, 230, and 232 may not be displayed.

Figure 3:
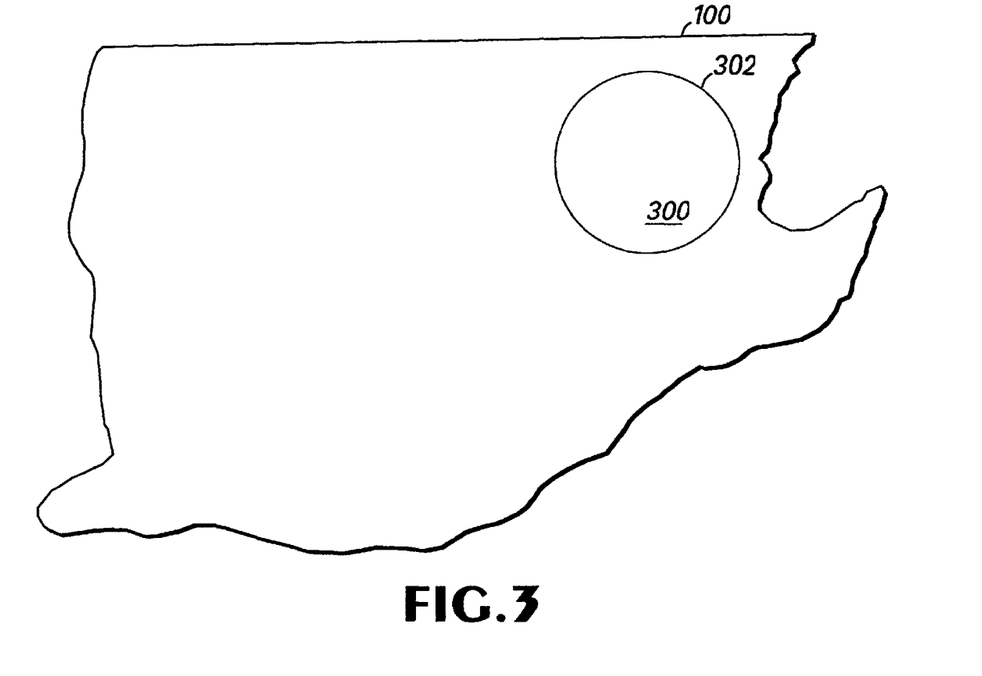
FIG. 3 illustrates the geographic area of FIG. 1 and a geographic section of that geographic area.

In FIG. 3, a portion of the geographic area 100 is selected as a geographic section 300. Preferably, the geographic section is a regular-shaped section such as a circle or a rectangle. The geographic section 300 is defined by a section boundary 302 including a plurality of section boundary points (not individually illustrated). Each of the plurality of section boundary points is a geographic point and preferably is described by longitude and latitude. In the customer service trouble tracking example, the geographic section may be selected by a user using a mouse or other pointing device.

Once the geographic section is received, a geographic region which overlaps the geographic section is selected as a selected geographic region. In the example illustrated by FIG. 4, geographic region 224 overlaps the geographic section 300 so geographic region 224 is selected as the selected geographic region. One method for determining whether a geographic region overlaps a geographic section is described in the concurrently filed and commonly assigned U.S. patent application Ser. No. 08/831104 entitled System and Method for Identifying the Geographic Region of a Geographic Area Which Contains a Geographic Zone (Attorney Docket No. 19260-0895). Specifically, the sections of that patent application entitled Preferred Methods for Identifying the Geographic Region Which Contains a Geographic Zone and Preferred Methods for Identifying the Geographic Region Which Contains a Geographic Zone Using Estimated Geographic Regions are incorporated herein by reference. To apply a method of the referenced patent application, the geographic section would function as a geographic zone. Alternative methods to determine whether a geographic region overlaps a geographic section will be apparent to those skilled in the art to which the present invention pertains.

Figure 4:
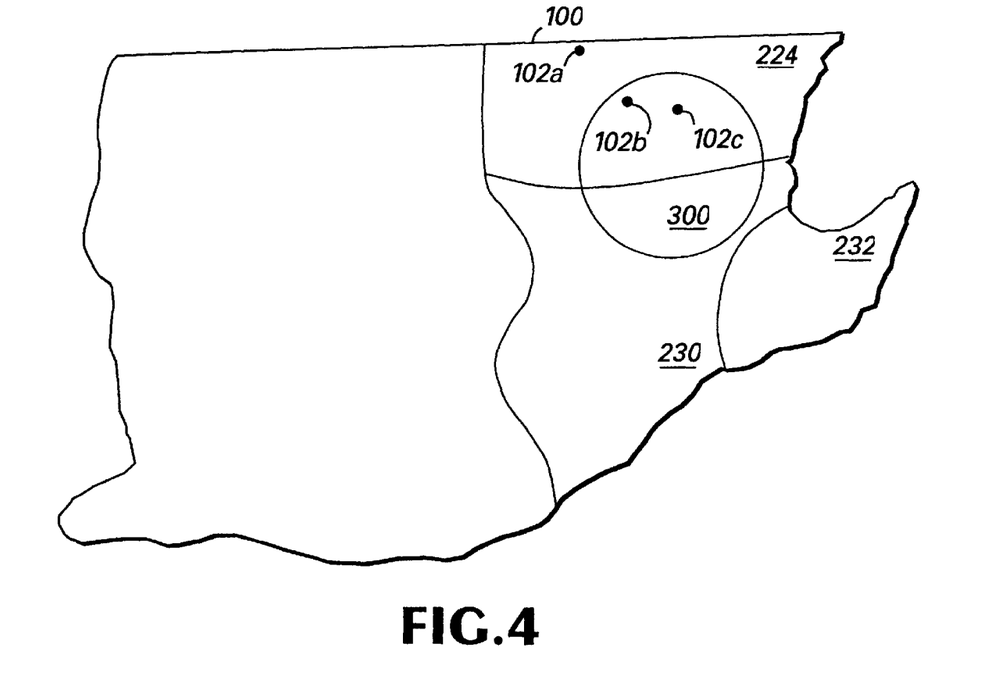
FIG. 4 illustrates three of the geographic regions of FIG. 2 and the geographic section of FIG. 3 in the geographic area of FIG. 1.

Once the selected geographic region is selected, one of the data records containing a geographic region identifier for the selected geographic region is selected as a selected data record. If geographic region 224 is selected as the selected geographic region, then a data record containing a geographic region identifier for geographic region 224 is selected as the selected data record. Once the selected data record is selected, the geographic point corresponding to the selected data record is selected as the selected geographic point. In this example, geographic point 102*c* is selected as the geographic point.

Once a geographic point is selected as a selected geographic point, a point determination is made as to whether the selected geographic point 102*c* is located within the geographic section 300. A method for making a point determination as to whether the selected geographic point 102*c* is located within the geographic section 300 is described in the previously referenced and commonly assigned U.S. patent application Ser. No. 08/831023 entitled System and Method for Identifying the Geographic Region of a Geographic Areas Which Contains a Geographic Point Associated with a Location. To apply a method of the referenced application, the geographic section would function as a geographic region. Alternative methods to determine whether a geographic point is located within a geographic section will be apparent to those skilled in the art to which the present invention pertains. In this example, the determination is that the selected geographic point 102*c* is located within the geographic section 300 so the selected data record is identified.

Preferably, if the selected geographic point is not located within the geographic section, then another data record containing a geographic region identifier for the selected geographic region is selected as a second selected data record. For example, if geographic point 102*a* is selected as the selected geographic point, then, as shown in FIG. 4, the point determination is that the selected geographic point is not located within the geographic section 300. In this case, another data record containing a geographic region identifier for the selected geographic region 224 is selected as a second selected data record. The geographic point corresponding to the second selected data record is selected as a second selected geographic point and a point determination is made as to whether the second selected geographic point is located within the geographic section.

Preferred Method for Identifying a Geographic Point Located Within a Geographic Section The present invention also provides a preferred method for identifying a geographic point located within a geographic section. In this preferred method, the first step is to divide the geographic area into a plurality of non-overlapping geographic regions. The next step is to select a geographic section within the geographic area. After selecting a geographic section, one of the geographic regions is selected as a selected geographic region. The selection of the geographic region may be arbitrary or may be based upon some type of hierarchy. For example, the geographic region last identified as overlapping a geographic section or most often identified as overlapping a geographic section may be identified. Once a geographic region is selected as a selected geographic region, a region determination is made as to whether the geographic section overlaps the selected geographic region. If the geographic section overlaps the selected geographic region, then a geographic point located within the selected geographic region is selected as a selected geographic point. The next step is to make a point determination as to whether the selected geographic point is located within the geographic section. If the selected geographic point is located within the geographic section, then the selected geographic point is identified.

The preferred method may be illustrated by reference to the figures. FIG. 1 shows a geographic area 100 with a plurality of geographic points 102a . . . 102n in the geographic area 100. In FIG. 2, the geographic area 100 is divided into a plurality of non-overlapping geographic regions 220, 222, 224, 226, 228, 230, and 232. In FIG. 3, a portion of the geographic area 100 is selected as a geographic section 300. The size and shape of the geographic section is independent of the size and shape of the geographic regions.

After the geographic section 300 is selected, one of the geographic regions is selected as a selected geographic region. In FIG. 4, geographic region 224 is selected as the selected geographic region. A region determination is made as to whether the geographic section 300 overlaps the selected geographic region 224. The region determination as to whether the geographic section 300 overlaps the selected region 224 may be made by using a method described in the previously referenced and commonly assigned U.S. patent application Ser. No. 08/831040 entitled System and Method for Identifying the Geographic Region of a Geographic Area Which Contains a Geographic Zone. Other methods for determining whether the geographic section overlaps the selected region will be apparent to those skilled in the art.

In this example, the region determination is that the geographic section 300 overlaps the selected region 224. The next step is to select a geographic point located within the selected geographic region 224 as a selected geographic point. In FIG. 4, geographic point 102c is selected as the selected geographic point. In the customer service trouble tracking example, the step of selecting a geographic point located within the selected region may be implemented using geographic region identifiers. A geographic point is located within the selected geographic region if the geographic region identifier associated with the geographic point identifies the selected geographic region.

After the selected geographic point 102c is selected, the next step is to make a point determination as to whether the selected geographic point 102c is located within the geographic section 300. If the selected geographic point 102c is located within the geographic section 300, then the selected geographic point is identified. A method described in the previously referenced and commonly assigned U.S. patent application Ser. No. 08/831023 for a System and Method for Identifying the Geographic Region of a Geographic Area Which Contains a Geographic Point Associated with a Location may be used to make a point determination as to whether the selected geographic point is located within the geographic section. Other methods for determining whether a geographic point is located within a geographic section will be apparent to those skilled in the art.

There may be times when there are a plurality of geographic points located within the geographic section. If the point determination is that the selected geographic point is located within the geographic section, then another geographic point located within the selected geographic region is selected as a second selected geographic point. Then, a point determination is made as to whether the second selected geographic point is located within the geographic section. If the point determination is that the second selected geographic point is located within the geographic section, then the second selected geographic point is identified. By repeating the steps of selecting a geographic point located within the selected region as a selected geographic point and making a determination as to whether the selected geographic point is located within the geographic section, all the geographic points in the selected geographic region and the geographic section may be identified.

Figure 5:
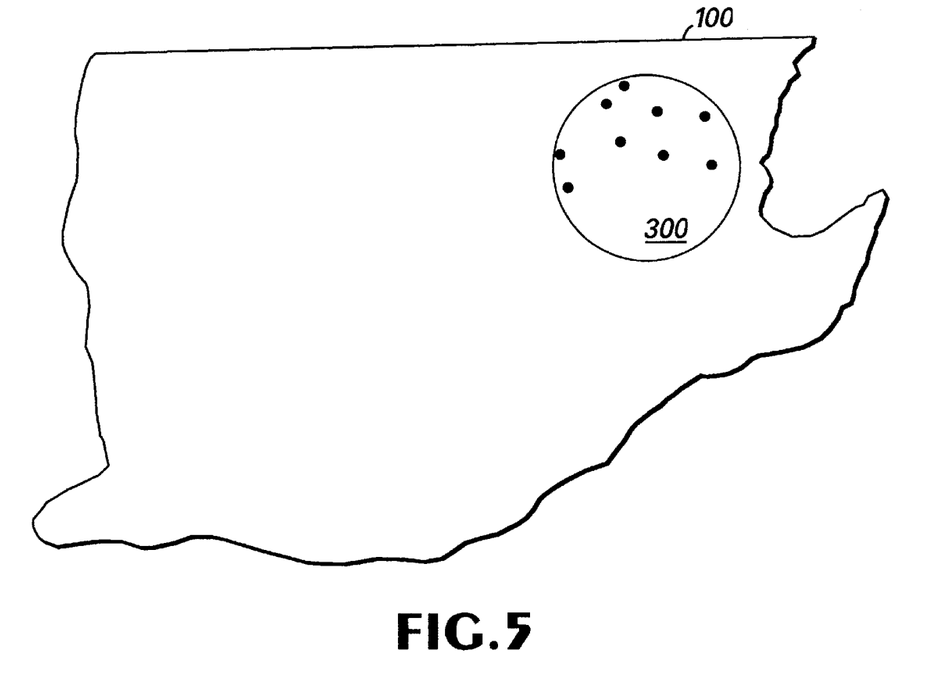
FIG. 5 illustrates geographic points located within a geographic region of FIG. 2 and the geographic section of FIG. 3.

This situation may be illustrated by reference to FIG. 4. If the geographic point 102c is selected as the selected geographic point, then as described above, the point determination is that the selected geographic point is located within the geographic section 300. Another geographic point located within the selected geographic region 224 is selected as a second selected geographic point 102b. Once the second selected geographic point 102b is selected, a point determination is made as to whether the second selected geographic point 102b is located within the geographic section 300. Using the steps described above in connection with first selected geographic point 102c, the point determination is that the second selected geographic point 102b is located within the geographic section 300. Thus, the second selected geographic point 102b is also identified. In this manner, all the geographic points in the selected geographic region and the geographic section are identified. FIG. 5 shows all the geographic points in the selected geographic region 224 and the geographic section 300 displayed on a map of the geographic area 100.

The geographic section may overlap more than one geographic region as shown in FIG. 4. In this situation, to identify all the geographic points within the geographic section, another geographic region is selected as a second selected geographic region. A region determination is made as to whether the geographic section overlaps the second selected geographic region. If the geographic section overlaps the second selected geographic region, then a geographic point located within the second selected geographic region is selected as a second selected geographic point. A point determination is made as to whether the second selected geographic point is located within the geographic section. If the second selected geographic point is located within the geographic section, then the second selected geographic point is identified.

Figure 6:
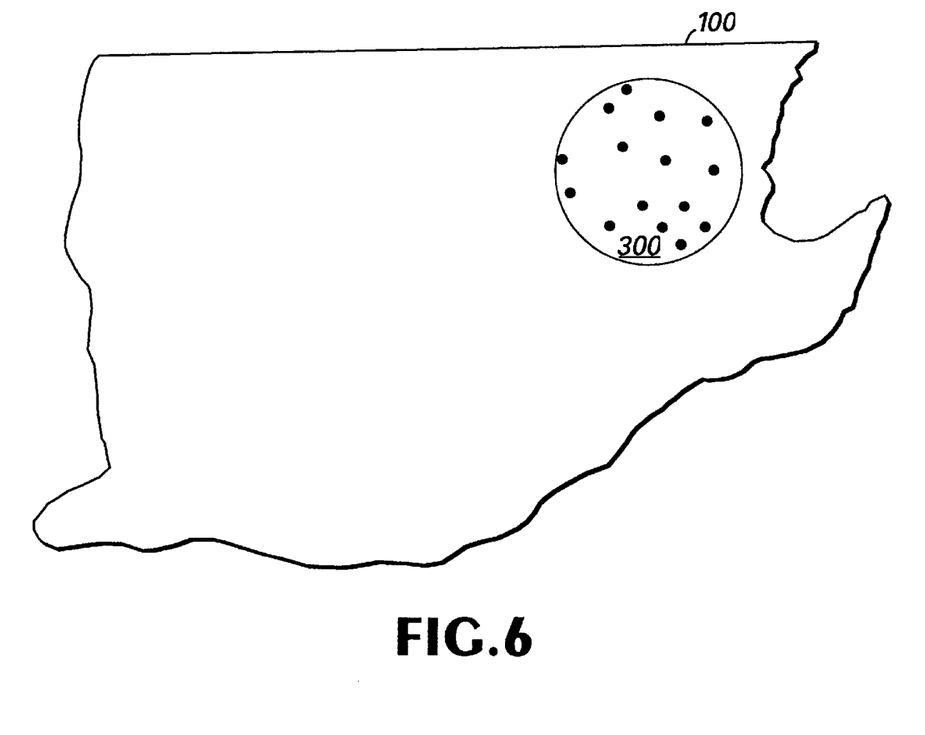
FIG. 6 illustrates geographic points located within the geographic section of FIG. 3 in the geographic area of FIG. 1.

Returning to the example of FIG. 4, if geographic region 230 is selected as the second selected geographic region, then the determination is that the geographic section 300 overlaps the second selected geographic region 230. As discussed above in connection with the example using geographic region 224 as the selected geographic region, a geographic point located within the second selected geographic region 230 is selected as a second selected geographic point and a point determination is made as to whether the second selected geographic point is located within the geographic section 300. In this manner, all the geographic points located within the geographic section may be identified, regardless of the number of geographic regions the geographic section overlaps. Once the geographic points located within the geographic section 300 are identified, the geographic points may be displayed on a map of the geographic area 100 as shown in FIG. 6.

There may be times when the selected geographic point is not located within the geographic section. Preferably, if the selected geographic point is not located within the geographic section, then another geographic point located within the selected geographic region is selected as a next selected geographic point. A point determination is made as to whether the next selected geographic point is located within the geographic section. If the next selected geographic point is located within the geographic section, then the next selected geographic point is identified. This situation is shown by FIG. 4 and selected geographic point 102a. Preferably, if the determination is that the selected geographic point 102a is not located within the geographic section 300, then another geographic point located within the selected geographic region 224 is selected as a next selected geographic point 102c. A point determination is made as to whether the next selected geographic point 102c is located within the geographic section 300. If the point determination is that the next selected geographic point 102c is located within the geographic section 300, then the next selected geographic point 102c is identified.

Depending upon the selection of a geographic region as a selected geographic region, the geographic section may not overlap the selected region. This situation is shown in FIG. 4. If geographic region 232 is selected as the selected geographic region, then the region determination is that the geographic section 300 does not overlap the selected geographic region 232. Then, preferably, another one of the plurality of geographic regions is selected as the selected geographic region and a region determination is made as to whether the geographic section overlaps that geographic region.

Flow Diagrams of the Preferred Methods

Figure 7:
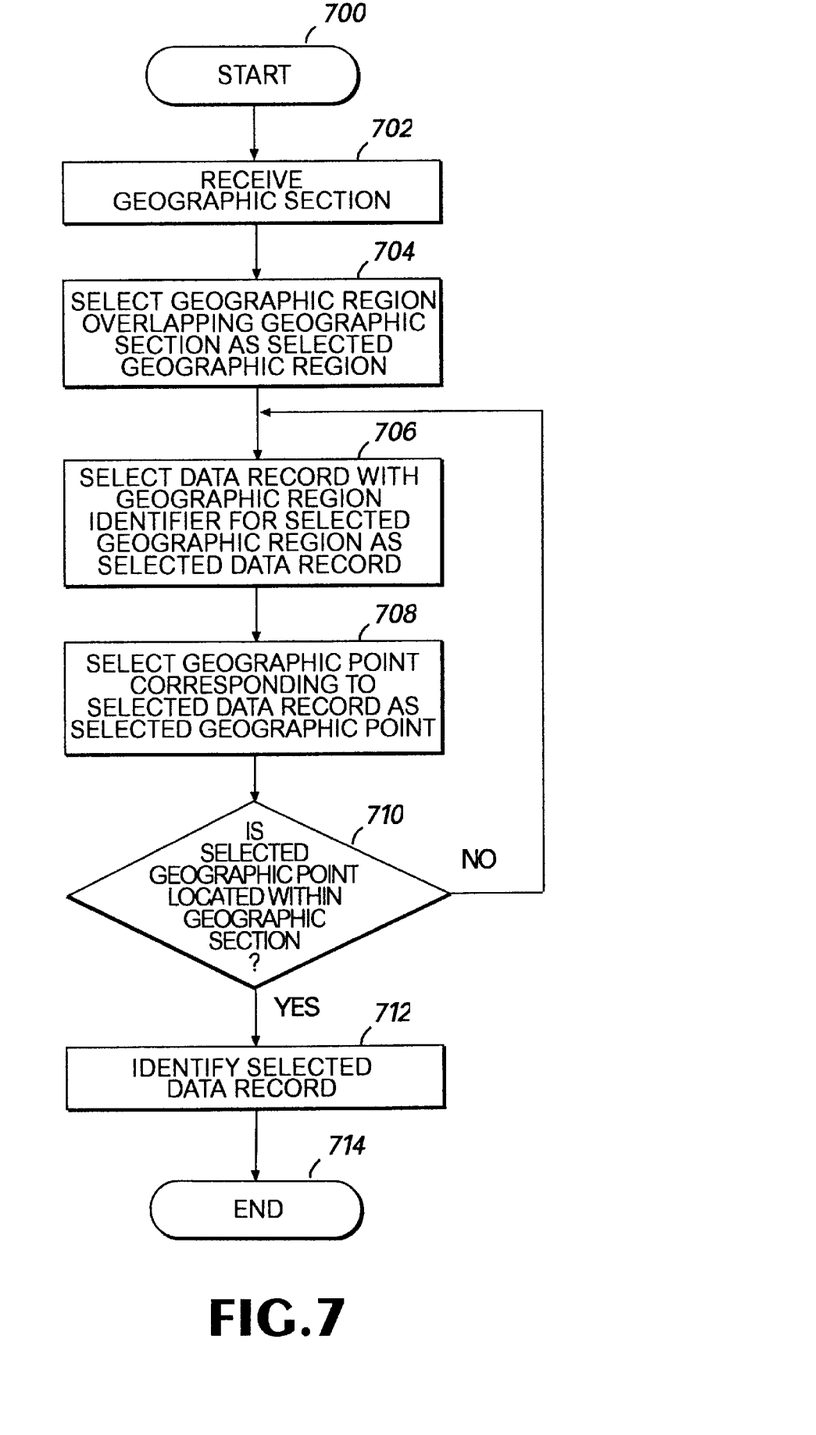
FIG. 7 is a flow diagram of the preferred method for identifying a data record corresponding to a geographic point located within a geographic section.

The preferred method of identifying a data record corresponding to a geographic point located within a geographic section may be illustrated by reference to the flow diagram of FIG. 7. The method begins at the START task of step 700. In step 702, a geographic section is received. Once the geographic section is received, a geographic region overlapping the geographic section is selected as a selected geographic region in step 704. A data record containing a geographic region identifier for the selected geographic region is selected as a selected data record in step 706. The selected data record corresponds to a geographic point which is selected as a selected geographic point in step 708. In step 710, a point determination is made as to whether the selected geographic point is located within the geographic section. If the selected geographic point is located within the geographic section, then the method proceeds to step 712 and the selected data record is identified. Once the selected data record is identified, the method ends at the END task of step 714. If the point determination in step 710 is that the selected geographic point is not located within the geographic section, then the method proceeds to step 706. In step 706, and another data record containing a geographic region identifier for the selected geographic region is selected as a selected data record and steps 708 and 710 are repeated.

Figure 8A:
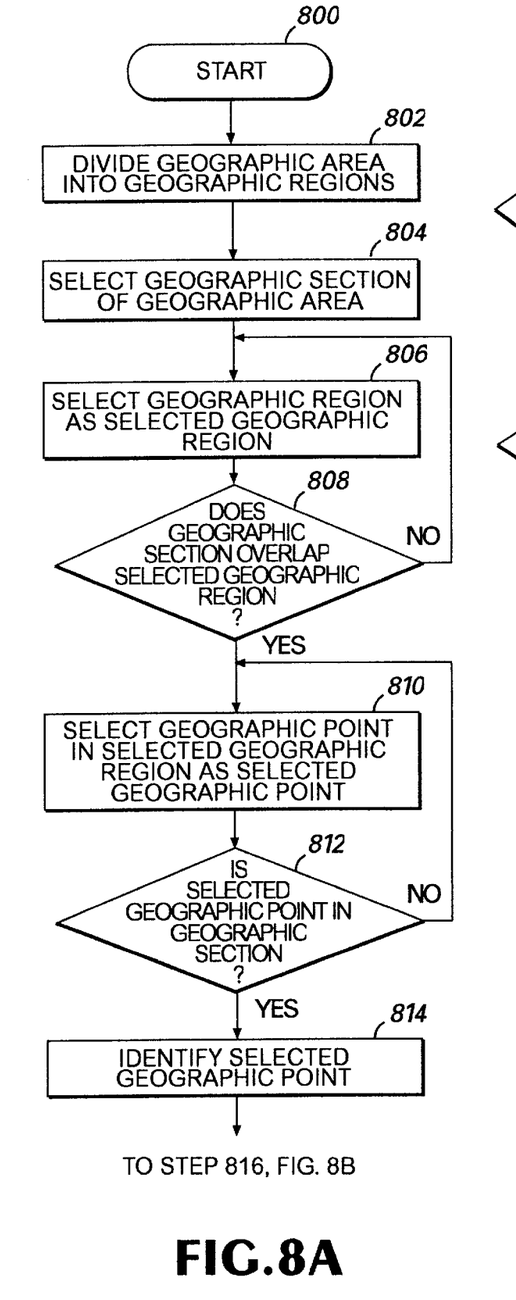
FIGS. 8A and 8B are flow diagrams of the preferred method for identifying a geographic point within a geographic section.

The preferred method of identifying a geographic point located in a geographic section may be illustrated by reference to the flow diagrams of FIGS. 8A and 8B. The method begins at the START task of step 800. The method proceeds to step 802 where the geographic area is divided into a plurality of non-overlapping geographic regions. In step 804, a portion of the geographic area is selected as a geographic section. After the geographic section is selected, one of the plurality of non-overlapping geographic regions is selected as the selected geographic region in step 806. In step 808, a region determination is made as to whether the geographic section overlaps the selected geographic region. If the geographic section overlaps the selected geographic region, then, in step 810, a geographic point located within the selected geographic region is selected as a selected geographic point. If the geographic section does not overlap the selected geographic region, then the method proceeds to step 806 and another geographic region is selected as the selected geographic region. In step 808, the selected geographic region is used to make another region determination as to whether the geographic section overlaps the selected geographic region.

Once a geographic point is selected as a selected geographic point, then, in step 812, a point determination is made as to whether the selected geographic point is located within the geographic section. If the selected geographic point is located within the geographic section, then the selected point is identified in step 814. If the selected geographic point is not located within the geographic section, then the method proceeds to step 810 and another geographic point in the selected geographic region is selected as a selected geographic point.

Figure 8B:
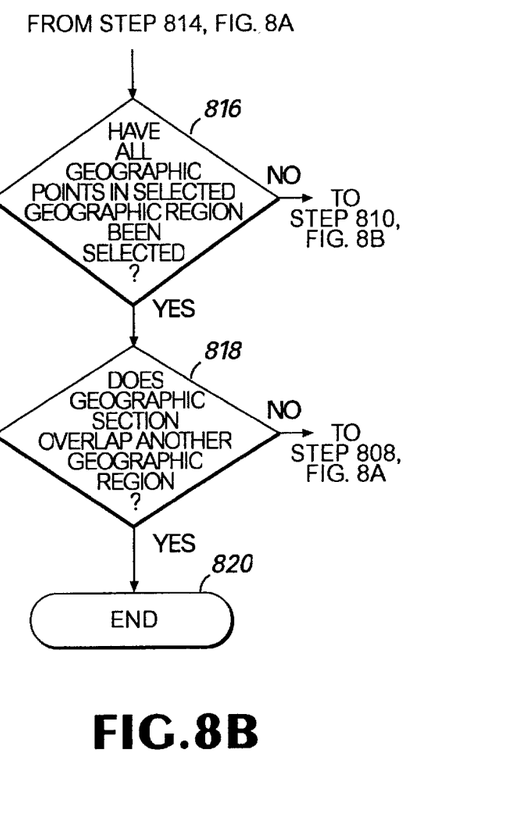

After the selected geographic point is identified in step 814, a determination is made in step 816 of FIG. 8B as to whether all the geographic points in the selected geographic region have been selected as a selected geographic point. If all the geographic points in the selected geographic region have not been selected as a selected geographic point, then another geographic point in the selected geographic region is selected as a selected geographic point and steps 812 and 814 of FIG. 8A are repeated. If all the geographic points in the selected geographic region have been selected as a selected geographic point, then the method proceeds to step 818.

In step 818, a determination is made as to whether the geographic section overlaps another geographic region. If the geographic section overlaps another geographic region, then the method proceeds to step 806 and another one of the geographic regions is selected as a selected geographic region. Steps 808, 810, 812 and 814 are repeated with that selected geographic point. If the geographic section does not overlap another geographic region, then the method ends at the END task of step 820.

The Computing Environment

Figure 9:
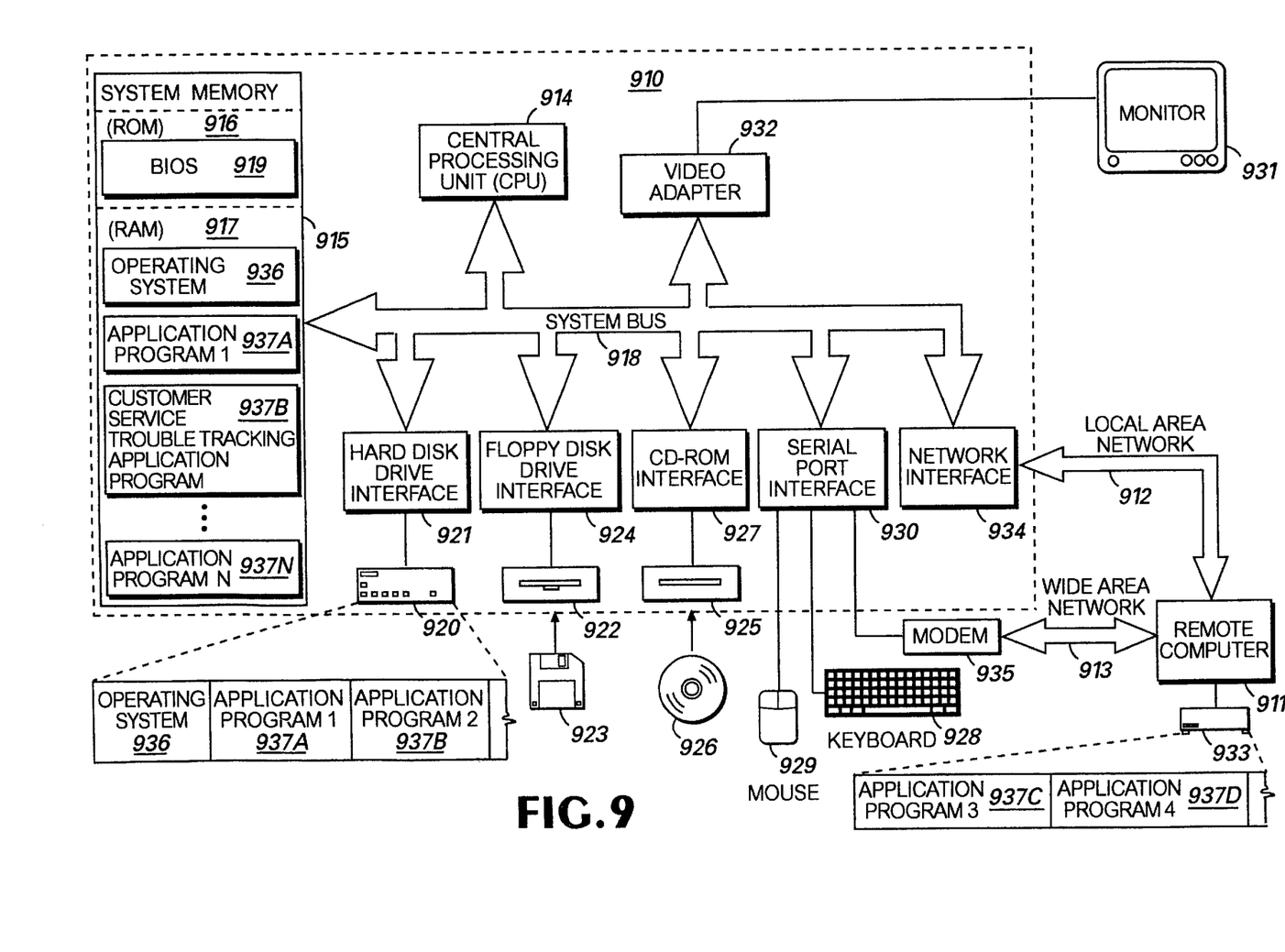
FIG. 9 is a block diagram of a personal computer that provides the operating environment for the preferred embodiment of the present invention.

The present invention can be implemented as a computer system responsive to instructions stored within a program module. FIG. 9 illustrates various aspects of the preferred computing environment in which the present invention is designed to operate. Those skilled in the art will appreciate that FIG. 9 and the associated discussion are intended to provide a brief, general description of the preferred computer hardware and program modules, and that additional information is readily available in the appropriate programming manuals, user's guides, and similar publications.

FIG. 9 illustrates a conventional personal computer 910 suitable for supporting the operation of the preferred embodiment of the present invention. As shown in FIG. 9, the personal computer 910 operates in a networked environment with logical connections to a remote computer 911. The logical connections between the personal computer 910 and the remote computer 911 are represented by a local area network 912 and a wide area network 913. Those of ordinary skill in the art will recognize that in this client/server configuration, the remote computer 911 may function as a file server or computer server.

Within the personal computer 910, a local hard disk drive 920 is connected to the system bus 918 via a hard disk drive interface 921. A floppy disk drive 922, which is used to read or write a floppy disk 923, is connected to the system bus 918 via a floppy disk drive interface 924. A CD-ROM drive 925, which is used to read a CD-ROM disk 926, is connected to the system bus 918 via a CD-ROM interface 927.

Although other internal components of the personal computer 910 are not shown, those of ordinary skill in the art will appreciate that such components and the interconnection between them are well known. Accordingly, additional details concerning the internal construction of the personal computer 910 need not be disclosed in connection with the present invention.

Those skilled in the art will understand that program modules such as an operating system 936, application programs 937, and data are provided to the personal computer 910 via computer-readable media. In the preferred computer, the computer-readable media include the local or remote memory storage devices, which may include the local hard disk drive 920, floppy disk 923, CD-ROM 926, RAM 917, ROM 916, and the remote memory storage device 933. In the preferred personal computer 910, the local hard disk drive 920 is used to store data and programs, including the operating system and programs.

The present invention can be implemented as a computer system responsive to instructions stored within a program module. The computer system may be responsive to instructions which perform the steps of the preferred method of identifying a data record corresponding to a geographic point located within a geographic section or the steps of the preferred method of identifying a geographic point located within a geographic section as sequences of computer-executed steps.

In conclusion, the present invention is a system and method for identifying a geographic point within a geographic section. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system in which a plurality of data records is stored in a memory device, each of said data records comprising a geographic region identifier and corresponding to a geographic point, a method for filtering said plurality of data records to identify a data record corresponding to a geographic point located within a geographic section of a geographic area, wherein said geographic area contains a plurality of geographic points and a plurality of geographic regions, comprising the steps of:

receiving a geographic section;

identifying a geographic region which overlaps said geographic section as a selected geographic region;

selecting a data record comprising a geographic region identifier for said selected geographic region as a selected data record;

selecting a geographic point corresponding to said selected data record as a selected geographic point;

making a point determination as to whether said selected geographic point is located within said geographic section; and when said selected geographic point is located within said geographic section, then identifying said selected data record.

2. The method of claim 1, wherein when said selected geographic point is not located within said geographic section, then selecting another one of said data records comprising a geographic region identifier for said selected geographic region as a second selected data record;

selecting a geographic point corresponding to said second selected data record as a second selected geographic point; and making a point determination as to whether said second selected geographic point is located within said geographic section.

3. In a geographic area containing a plurality of geographic points, a computer-implemented method for identifying a geographic point which is located within a geographic section of said geographic area, comprising the steps of:

(a) dividing said geographic area into a plurality of non-overlapping geographic regions;

(b) receiving a geographic section of said geographic area;

(c) selecting one of said non-overlapping geographic regions as a selected geographic region;

(d) making a region determination as to whether said geographic section overlaps said selected geographic region;

(e) when said geographic section overlaps said selected geographic region, then selecting a geographic point located within said selected region as a selected geographic point;

(f) making a point determination as to whether said selected geographic point is located within said geographic section; and (g) when said selected geographic point is located within said geographic section, then identifying said selected geographic point.

4. The method of claim 3, further comprising the steps of:

selecting another one of said non-overlapping geographic regions as a second selected geographic region;

making a region determination as to whether said geographic section overlaps said second selected geographic region:

when said geographic section overlaps said second selected geographic region, then selecting a geographic point located within said second selected geographic region as a second selected geographic point;

making a point determination as to whether said second selected geographic point is located within said geographic section; and when said second selected geographic point is located within said geographic section, then identifying said second selected geographic point.

5. The method of claim 3, wherein said selected point is a first selected geographic point, further comprising the steps of:

when said point determination is that said first selected geographic point is located within said geographic section, then selecting another geographic point located within said selected geographic region as a second selected geographic point;

making a point determination as to whether said second selected geographic point is located within said geographic section; and when said second selected geographic point is located within said geographic section, then identifying said second selected geographic, point.

6. The method of claim 3, wherein said selected geographic point is a first selected geographic point, and further comprising the steps of:

when said point determination is that said first selected geographic point is not located within said geographic section, then selecting another geographic point located within said selected geographic region as a next selected geographic point;

making a point determination as to whether said next selected geographic point is located within said geographic section; and when said next selected geographic point is located within said geographic section, then identifying said next selected geographic point.

7. The method of claim 3, further comprising the step of:

when said region determination in said step (d) is that said geographic section does not overlap said selected geographic region, then repeating step (c) followed by step (d) with another one of said plurality of non-overlapping geographic regions.

8. A computer system for identifying a geographic point which is located within a geographic section of a geographic area, comprising;

a central processing unit (CPU);

an input device connected to said CPU;

a display device coupled to said CPU; and memory coupled to said CPU for storing a program module;

said CPU, responsive to instructions from said program module, being operative to:

divide said geographic area into a plurality of non-overlapping geographic regions;

receive from said input device a geographic section;

select one of said non-overlapping geographic regions as a selected geographic region;

make a region determination as to whether said geographic section overlaps said selected geographic region;

said geographic section overlaps said selected geographic region, then select a geographic point located within said selected geographic region as a selected geographic point;

make a point determination as to whether said selected geographic point is located within said geographic section; and when said selected geographic point is located within said geographic section, then identify said selected geographic point.

9. The computer system of claim 8, wherein said CPU is further responsive to:

when said selected geographic point is identified, then display said selected geographic point on said display device.

10. The computer system of claim 8, wherein said CPU is further responsive to select another geographic point located within said geographic section as a second selected geographic point and to repeat operations to:

make a point determination as to whether said second selected geographic point is located within said geographic section; and when said second selected geographic point is located within said geographic section, then displaying said second selected geographic point on said display device.

11. The computer system of claim 8, wherein said CPU is further responsive to:

select another one of said non-overlapping geographic regions as a second selected geographic region;

make a region determination as to whether said geographic section overlaps said second selected geographic region;

when said geographic section overlaps said second selected geographic region, then select a geographic point located within said second selected geographic region as a second selected geographic point;

make a point determination as to whether said second selected geographic point is located within said geographic section; and when said second selected geographic point is located within said geographic section, then displaying said second selected geographic point on said display device.

12. The computer system of claim 8, wherein said CPU is responsive to receive said geographic section which is selected from a map of said geographic area using a pointing device as said input device.

13. In a computer system in which a plurality of data records is stored in a memory device, each of said data records comprising a geographic region identifier and corresponding to a geographic point, a method for determining whether a geographic point corresponding to a data record is located within a geographic section of a geographic area, wherein said geographic area contains a plurality of geographic points and a plurality of geographic regions, comprising the steps of:

receiving a geographic section;

identifying a geographic region which overlaps said geographic section as a selected geographic region;

selecting a data record comprising a geographic region identifier for said selected geographic region as a selected data record;

selecting a geographic point corresponding to said selected data record as a selected geographic point; and making a point determination as to whether said selected geographic point is located within said geographic section.

* * * * *